United States Patent [19]

Messing

[11] 3,892,580

[45] July 1, 1975

[54] METHOD OF MAKING POROUS INORGANIC BODIES

[75] Inventor: Ralph A. Messing, Horseheads, N.Y.

[73] Assignee: Corning Glass Works, Corning, N.Y.

[22] Filed: Mar. 26, 1973

[21] Appl. No.: 344,964

[52] U.S. Cl............... 106/41; 106/40 R; 106/73.3; 106/73.4; 106/73.5
[51] Int. Cl............................................ C03c 11/00
[58] Field of Search......... 106/40 R, 41, 39.5, 40 V, 106/73.3, 73.4, 73.5; 264/43, 44

[56] References Cited
UNITED STATES PATENTS

| | | | |
|---|---|---|---|
| 3,347,798 | 10/1967 | Baer et al. | 264/44 X |
| 3,598,618 | 8/1971 | Fujii et al. | 106/40 R |

FOREIGN PATENTS OR APPLICATIONS

| | | | |
|---|---|---|---|
| 1,062,410 | 3/1967 | United Kingdom | 106/40 R |

Primary Examiner—Winston A. Douglas
Assistant Examiner—John F. Niebling
Attorney, Agent, or Firm—James A. Giblin; Clinton S. Janes, Jr.; Clarence R. Patty, Jr.

[57] ABSTRACT

This invention relates to the production of porous bodies of silica ($SiO_2$), alumina ($Al_2O_3$), titania ($TiO_2$), and zirconia ($ZrO_2$) having a skeletal density approximating theoretical density of the metal oxide, a high pore volume, a high wall porosity, and a very narrow range of pore distribution. The process involves reacting the metal oxide particles with a liquid binder selected from the group consisting of acetic acid, sodium acetate, magnesium acetate, zinc acetate, and propionic acid, drying, and firing the mixture at a temperature below that at which the material sinters.

6 Claims, No Drawings

METHOD OF MAKING POROUS INORGANIC BODIES

The utility of particles having high surface areas due, at least in part, to inherent high porosity has been constantly increasing in recent years in such diverse applications as catalyst supports, filter media, and as carriers in chromatographic columns. Still another area which has experienced almost explosive activity within the past few years is the development of a wide variety of immobilized enzyme composites. The present invention provides porous bodies which are especially useful in that field.

Enzymes have frequently been termed nature's catalysts and are complex organic substances, usually proteins such as amylase and pepsin, which accelerate (catalyze) specific chemical transformation, as in the digestion of foods in plants and animals. Over 700 enzymes have been studied and classified by various researchers throughout the world, this classification being based upon the type of reaction or the material (substrate) acted upon. Most enzymes exhibit long chain, complicated structures with high molecular weights and are commonly soluble in water. This solubility of enzymes in water has limited the utility thereof for some applications inasmuch as their removal from reaction media is rendered difficult with consequent adverse effects upon the purity of the final product. Furthermore, and very importantly economically, soluble enzymes can be used only once in a batchtype reaction. Therefore, because of the high costs frequently involved with many enzymes, the use of enzymes on a large industrial scale was severely limited even though their utility as extremely active catalysts was well-recognized. Consequently, numerous techniques have been contrived to "immobilize," "insolubilize," or "stabilize" enzymes by attaching or bonding them to carrier materials which are insoluble in water in such a manner that the enzyme is rendered immobile but is available to exercise its catalytic activity. The terms "insoluble" and "insolubilized" denote enzymes which have been made essentially insoluble in water through attachment to, or entrapment within, a water-insoluble carrier material. "Immobile" and "immobilized" refer to enzymes which have insolubilized in such a manner that the shape or conformation thereof necessary for catalysis has been retained. Finally, the expressions "stable" and "stabilized" denote enzymes which exhibit significant retention of enzymatic activity or the ability to catalyze reactions over an extended period of time. Hence, the focal point of all these techniques has been to provide means for presenting enzymes within a reaction environment whereby the catalytic activity thereof could be enjoyed in successive reactions over a prolonged span of time rather than a single batch-type reaction process.

U.S. Pat. No. 3,556,945 discloses the adsorption of enzymes to a variety of siliceous materials having available surface silanol groups. U.S. Pat. No. 3,519,528 describes means for chemically coupling enzymes to an essentially limitless variety of inorganic materials through the mechanism of silane coupling agents. In view of the requirement for extremely high surface area for loading the enzymes, porous glass particles or beads have been employed in both of these methods for enzyme attachment. A paper by R. A. Messing in ENZYMOLOGIA, 39, pp. 12–14 (1970) provides a brief discussion of the relationship existing between the quantity of enzyme which can be adsorbed to a porous glass and the surface area and pore size therein.

However, U.S. application Ser. No. 227,205, filed Feb. 17, 1972 now U.S. Pat. No. 3,783,101 in the names of William H. Tomb and Howard H. Weetall, explains that siliceous carriers, such as porous glass, are not highly durable in basic environments. This circumstance limits the utility thereof at those pH values where many enzymes are at their most active. That invention describes the coating of siliceous carriers with an alkali-durable metal oxide.

U.S. application Ser. No. 332,807, now U.S. Pat. No. 3,850,751 filed Feb. 16, 1973 in the name of Ralph A. Messing, describes the effectiveness of certain non-siliceous, water-insoluble carrier materials demonstrating excellent alkaline durability. These materials were selected from the group of alumina ($Al_2O_3$), titania ($TiO_2$), and zirconia ($ZrO_2$). That invention demanded porous materials of high surface area having an average pore diameter at least as large as the largest dimension of the enzyme to be bonded thereto, but less than 1000A. The minimum useful pore size is that which will permit entry of the enzyme into the internal porous network and mass diffusion of the enzyme throughout the pores. The maximum size of 1000A is dictated by a decrease in the surface area of the carrier resulting from larger pores and by the fact that there is a reduction in the amount of protection which the rigid pores can provide for the enzyme against a turbulent reaction environment.

It can be readily recognized that the most efficient enzyme utilization will be possible where the pores are carefully controlled to match the size of the enzyme to be attached to the internal pore surface and this size maintained with good uniformity. Hence, a uniform pore size will insure entry of the enzyme into the pores and avoid loss thereof from the pores in the turbulent reaction environment.

The largest dimension of a particular enzyme can be determined approximately by conventional means from its molecular weight or by exclusion techniques. In the case of enzymes exhibiting a spherical configuration, the largest dimension will approach the diameter of the molecule. With the more common enzymes having an elongate structure, the largest dimension will approximate the length of the enzyme. In general, most enzymes can be effectively bonded within the pores of carriers wherein the average pore diameter ranges between about 100A to 1000A, with the preferred values averaging about 100A to 500A. Nevertheless, it must be re-emphasized that the ideal average pore size exhibited by the carrier is directly dependent upon the size of enzyme to be bonded therewithin.

Therefore, the primary object of the present invention is to provide a method for making porous bodies of $Al_2O_3$, $TiO_2$, $ZrO_2$, and, optionally, $SiO_2$ wherein the pore diameter ranges between about 100A to 1000A and wherein the skeletal density of the porous body approaches the theoretical density of the inorganic oxide, the pore volume and wall porosity are high, and the pore size varies only within a relatively narrow range, viz., at least about 90 percent fall within ± 10 percent of the average value.

The basis of the present porous body technology contemplates the joining together of particles having controlled dimensions. In simplest terms, the porous bodies of the instant invention are made by mixing a liquid binder solution with the inorganic oxides to yield a mixture of a uniform consistency. This mixture is then dried and fired at a temperature below the sintering temperature of the inorganic oxide.

It can readily be appreciated that the liquid binder employed should not dissolve or substantially erode the inorganic oxide particles lest they will no longer permit the achievement of a controlled pore dimension which is a function of the initial particle size. Such a circumstance essentially eliminates the common mineral acids, e.g., HF, HCl, $H_2SO_4$, $HNO_3$, etc., from consideration. Yet, some surface reaction between the particles and the binder is required to cause the joining together of the particles. The present invention is founded upon the unique utility of acetic acid, propionic acid, sodium acetate, magnesium acetate, and zinc acetate as binders for the inorganic oxide particles $Al_2O_3$, $TiO_2$, $ZrO_2$, $SiO_2$, and mixtures thereof.

The general technique utilized for the preparation of the porous bodies of this invention involves three steps. The first comprises combining the oxide particles with the binder solution at room temperature or at a slightly elevated temperature, e.g., up to about 60°C., but below that at which substantial volatilization will occur and definitely below the boiling point of the aqueous solutions employed. Lower temperatures down to the freezing point of the solutions can be utilized also, of course, but are normally less convenient than simply performing the mixing at room temperature and do not yield any improvement in the final body. The resultant slurry of particles and binder is then dried, preferably at an elevated temperature approaching the boiling point of the solution, e.g., 90°–100°C., although lower temperatures can be used for longer periods. Normally, the drying is undertaken at temperatures below the boiling point of the solution to eliminate the hazard of the particles being violently agitated as the water is vigorously expelled. Whereas simple air drying for several hours is normally employed, more rapid methods such as spray drying, drum drying, or the use of vacuum are obviously also quite feasible. Finally, the dry green bodies are fired at elevated temperatures to develop a chemical bond between the oxide particles. A temperature of at least 450°C. has been found necessary for this step with the range of 500°–600°C being preferred. Temperatures up to 800°C. have been satisfactorily utilized but such high temperatures demand extreme caution to avoid destruction of the pores through sintering of the material. In the main, firing the green bodies for about 1–3 hours at 500°–600°C. has yielded eminently satisfactory porous bodies.

Table I records a group of particulate inorganic oxides which were employed in the following working examples along with several physical properties thereof:

TABLE I

| Oxide | Particle Diameter (A) | Surface Area (meter$^2$/gram) | Density (gram/cc.) |
|---|---|---|---|
| $Al_2O_3$ | 167 | 100 | 3.5–3.9 |
| $TiO_2$ | 320 | 48 | 4.2 |
| $ZrO_2$ | 210 | 50 | 5.5 |
| $SiO_2$ | 550 | 50 | 2.1–2.3 |

Table II reports the binder solutions employed, the amounts of each utilized, and the particulate oxide material combined therewith to yield the porous bodies listed in Table III. Each of porous bodies was prepared by mixing the aqueous binder solution with the oxide particles. The pH of each slurry was determined after the samples had achieved a stable pH value. The samples were dried in air at 90°–100°C. overnight and thereafter fired at 525°C.–550°C. for about 1–2 hours. After cooling to room temperature, the bodies were submitted for porosimetry analyses utilizing mercury intrusion.

TABLE II

| Example No. | Binder Solution | Binder Volume (ml.) | $Al_2O_3$ (grams) | $TiO_2$ (grams) | $ZrO_2$ (grams) | $SiO_2$ (grams) |
|---|---|---|---|---|---|---|
| 1 | 0.1M Acetic Acid | 17 | 10 | — | — | — |
| 2 | Distilled Water | 150 | 35 | — | — | 75 |
| 3 | Distilled Water | 17 | 10 | — | — | — |
| 4 | 0.1M Sodium Acetate | 17 | 10 | — | — | — |
| 5 | 0.1M Formic Acid | 17 | 10 | — | — | — |
| 6 | 0.1M Propionic Acid | 17 | 10 | — | — | — |
| 7 | Distilled Water* | 17 | 10 | — | — | — |
| 8 | 0.1M Acetic Acid | 17 | — | 10 | — | — |
| 9 | Distilled Water | 17 | — | 10 | — | — |
| 10 | 0.1 Sodium Acetate | 17 | — | 10 | — | — |
| 11 | 0.1 Formic Acid | 17 | — | 10 | — | — |
| 12 | 0.1 Propionic Acid | 17 | — | 10 | — | — |
| 13 | Distilled Water** | 17 | — | 10 | — | — |
| 14 | 0.1M Acetic Acid | 17 | — | — | 10 | — |
| 15 | Distilled Water | 17 | — | — | 10 | — |
| 16 | 0.1M Sodium Acetate | 17 | — | — | 10 | — |
| 17 | 0.1M Propionic Acid | 17 | — | — | 10 | — |
| 18 | 0.1M Acetic Acid | 17 | — | — | — | 10 |
| 19 | Distilled Water | 17 | — | — | — | 10 |
| 20 | 0.1M Sodium Acetate | 17 | — | — | — | 10 |
| 21 | 0.1M Formic Acid | 17 | — | — | — | 10 |
| 22 | 0.1M Propionic Acid | 17 | — | — | — | 10 |
| 23 | Distilled Water*** | 17 | — | — | — | 10 |
| 24 | 0.1M Magnesium Acetate | 32 | — | — | — | 10 |
| 25 | 1.66M Zinc Acetate | 200 | — | — | — | 60 |
| 26 | 0.1M Magnesium Acetate | 325 | 100 | — | — | — |
| 27 | 0.1M Magnesium Acetate | 325 | — | 100 | — | — |

*Added 1.0 ml 0.1N HCl and 0.5 ml 1N HCl, pH adjusted to 4.07
**Added 0.16 ml 1N HCl and 0.8 ml 0.1N HCl, pH adjusted to 3.18
***Added 0.5 ml 0.1N HCl, pH adjusted to 2.57

Table III provides a summary of the porosity data and pH values measured on the individual samples. A brief commentary regarding the character of each porous body is also included.

Furthermore, whereas aqueous solutions have been employed in the examples above as a matter of convenience and in the interest of economy, it will be appreciated that non-aqueous solvents such as ethanol and

TABLE III

| Example No. | pH | Pore Volume (cc/g) | Skeletal Density (g/cc) | Wall Porosity (%) | Pore Diameter in A Maximum | Pore Diameter in A Average | Pore Diameter in A Minimum | Comments |
|---|---|---|---|---|---|---|---|---|
| 1 | 4.05 | 0.579 | 3.372 | 67.8 | 200 | 175 | 140 | Excellent—high density and porosity—less than 5% of pore diameters outside of desired average range |
| 2 | 4.00 | 0.670 | 2.141 | 64.6 | 450 | 320 | 220 | Poor—low density and pore size varied quite widely from average range |
| 3 | 4.22 | 0.578 | 2.436 | 60.5 | 200 | 180 | 140 | Poor—low density and wall porosity—pore size varied quite widely from average range |
| 4 | 4.85 | 0.612 | 2.974 | 67.1 | 200 | 180 | 140 | Good—high porosity and less than 10% of pore diameters outside of desired average—density slightly low |
| 5 | 4.01 | 0.555 | 1.457 | 48.9 | 200 | 160 | 140 | Poor—low density and porosity—pore size nonuniform |
| 6 | 4.01 | 0.571 | 3.432 | 67.2 | 200 | 180 | 120 | Excellent—high density and porosity—less than 5% of pore diameters outside of desired average range |
| 7 | 4.07 | 0.578 | 1.313 | 46.5 | 200 | 160 | 120 | Poor—low density and porosity—pore size nonuniform |
| 8 | 2.93 | 0.375 | 3.960 | 61.4 | 288 | 275 | 220 | Excellent—high density and wall porosity—less than 5% of pore diameters outside of desired average range |
| 9 | 4.57 | 0.403 | 3.396 | 59.3 | 350 | 300 | 220 | Poor—low density and nonuniform pore size |
| 10 | 6.10 | 0.447 | 3.372 | 61.8 | 440 | 350 | 200 | Fair—high porosity but low density and about 10% of pore diameters outside of desired average range |
| 11 | 2.51 | 0.405 | 1.197 | 34.1 | 300 | 270 | 180 | Poor—low density and porosity with nonuniform pore size |
| 12 | 2.99 | 0.429 | 3.232 | 58.9 | 300 | 270 | 220 | Fair—low density but high wall porosity and less than 10% of pore diameters outside of desired average range |
| 13 | 3.18 | 0.349 | 3.760 | 57.5 | 300 | 250 | 200 | Poor—high density but low porosity and nonuniform pore size |
| 14 | 1.73 | 0.214 | 5.674 | 57.7 | 190 | 175 | 150 | Excellent—high density and porosity—less than 5% of pore diameters outside of desired average |
| 15 | 2.40 | 0.236 | 4.995 | 55.2 | 190 | 180 | 150 | Poor—low density and porosity |
| 16 | 5.51 | 0.321 | 5.349 | 65.0 | 240 | 220 | 160 | Good—high density and porosity—less than 10% of pore diameters outside of desired average range |
| 17 |  | 0.306 | 5.265 | 62.3 | 200 | 180 | 160 | Good—high density and porosity—less than 10% of pore diameters outside of desired average range |
| 18 | 2.88 | 0.910 | 1.894 | 65.5 | 900 | 450 | 250 | Fair—high density and porosity but greater than 10% of pore diameters are outside desired average range |
| 19 | 3.71 | 0.769 | 1.651 | 59.5 | 870 | 450 | 260 | Poor—low density and porosity with nonuniform pore size |
| 20 | 6.02 | 0.808 | 2.100 | 65.3 | 680 | 510 | 350 | Excellent—high density and porosity with less than 5% of pore diameters outside desired average range |
| 21 | 2.39 | 0.936 | 0.851 | 48.0 | 875 | 500 | 225 | Poor—low density and porosity with nonuniform pore size |
| 22 | 2.88 | 0.954 | 1.785 | 64.0 | 800 | 500 | 220 | Fair—fair density and porosity and greater than 10% of pore diameters outside desired average range |
| 23 | 2.57 | 1.006 | 1.070 | 52.5 | 900 | 480 | 180 | Poor—low density and porosity with nonuniform pore size |
| 24 | 6.25 | 0.872 | 1.566 | 60.4 | 875 | 550 | 350 | Good—high porosity with less than about 10% pore diameters outside desired average range |
| 25 |  | 0.830 | 2.080 | 67.0 | 875 | 675 | 400 | Good—high density and porosity with less than 10% of pore diameters outside desired average range |
| 26 | 5.69 | 0.601 | 3.019 | 69.5 | 250 | 200 | 145 | Excellent—high density and porosity with less than about 5% of pore diameters outside desired average range |
| 27 | 6.29 | 0.571 | 3.580 | 68.9 | 450 | 350 | 220 | Excellent—high density and porosity with less than about 5% of pore diameters outside desired average range |

Table III clearly illustrates that acidity of solution alone is not responsible for permitting the production of porous bodies having the desired uniformity of pore size. Thus, Examples 7, 13, and 23 provided slurries wherein the pH varied throughout the acid range but the resultant products exhibited poor quality. Hence, the acetic acid, propionic acid, magnesium acetate, and zinc acetate enter into some special reaction with the $Al_2O_3$, $TiO_2$, $ZrO_2$, and $SiO_2$ particles to yield the uniformly porous articles of the invention.

Although 0.1M aqueous solutions of the binder materials were employed in the above-described examples, it will be appreciated that the concentrations thereof can be varied more-or-less essentially at will provided that care is taken not to dissolve the inorganic oxides. Of course, very dilute solutions will require longer exposure periods to react with the particulate material. In general, solutions between about 0.01M–2M have proven very satisfactory.

methylethyl ketone can also be employed. These solvents are frequently more rapid evaporating than water and, therefore, their use can reduce the time required for drying. However, they also may require more careful handling due to their ready combustion.

Finally, a combination of Table I with Table III demonstrates that the average pore diameter of the porous body can be controlled by exercising care in selecting the particle size of the original inorganic oxide. Hence, the average pore size of the porous product will approximate the size of the starting particles. Conversely, then, to secure porous bodies containing pores having diameters ranging between about 100A–1000A will generally require the use of inorganic oxide particles varying in size between about 100A–1000A.

It has been further observed that the surface area of the porous body does not differ markedly from that of the base inorganic oxide particles, as is evidenced in the following two examples.

EXAMPLE 28

To 170 ml of 0.1M acetic acid in a 400 ml beaker, 100 grams of the $TiO_2$ reported in Table I were added with stirring and gentle heating to 40°C. over a fifteen minute interval. The beaker with the slurry was placed in an oven to dry overnight at 95°C. The sample was then fired for 70 minutes in a furnace operating at 525°C. Porosimetry analysis indicated a pore volume of 0.4 cc/g, a wall porosity of 59.4 percent, a minimum pore diameter of 200A, a maximum pore diameter of 350A, and an average pore diameter of 300A with less than 5 percent of the pore diameters outside of the desired average range. The body had a surface area of 51 meters $^2$/g.

The particle diameter of the starting $TiO_2$ material was 320A and the surface area was 48 meters $^2$/g.

EXAMPLE 29

To 34 ml. of 0.1M acetic acid in a 100 ml. beaker, 20 grams of $ZrO_2$ were added with stirring. The sample was oven dried overnight at 100°C., and subsequently fired for three hours in a furnace operating at 525°C. The porous body exhibited the following characteristics: a surface area of 54 meters$^2$/g, a pore volume of 0.24 cc/g, a wall porosity of 60.4 percent, a minimum pore diameter of 170A. Less than 5 percent of the pore diameters were outside of the desired average range.

The particle diameter of the starting $ZrO_2$ material was 210A and the surface area thereof was 50 meter$^2$/g.

I claim:

1. A method for producing porous bodies from $Al_2O_3$, $TiO_2$, $ZrO_2$, $SiO_2$, and mixtures thereof having pore diameters ranging between about 100A–1000A, wherein the skeletal density of the porous body approaches the theoretical density of the oxide and at least about 90 percent of the pores have pore diameters which fall within ± 10 percent of the average pore diameter value, which comprises:
    a. forming a slurry consisting of particulate $Al_2O_3$, $TiO_2$, $ZrO_2$, $SiO_2$, and mixtures thereof, wherein the particle diameters thereof approximate the desired average pore diameter and range between about 100A–1000A, and a solution selected from the group consisting of acetic acid, propionic acid, magnesium acetate, zinc acetate, and sodium acetate;
    b. drying said slurry; and
    c. firing the dried material at about 450°–800°C.

2. A method according to claim 1 wherein said slurry is made utilizing a solution at temperatures ranging between the freezing point and boiling point thereof.

3. A method according to claim 1 wherein said solution is an aqueous solution.

4. A method according to claim 3 wherein said acetic acid, propionic acid, magnesium acetate, zinc acetate, and sodium acetate are present in amounts ranging between about 0.01–2M.

5. A method according to claim 1 wherein said drying is carried out at temperatures between the freezing point and boiling point of the solution.

6. A method according to claim 1 wherein said firing is carried out at a temperature between about 500°–600°C.

* * * * *